United States Patent
Mizoi

(10) Patent No.: US 8,226,165 B2
(45) Date of Patent: Jul. 24, 2012

(54) VEHICLE SEAT

(75) Inventor: Kensuke Mizoi, Shioya-gun (JP)

(73) Assignee: TS Tech Co., Ltd, Asaka-Shi (JP)

( * ) Notice: Subject to any disclaimer, the term of this patent is extended or adjusted under 35 U.S.C. 154(b) by 496 days.

(21) Appl. No.: 12/304,993

(22) PCT Filed: Jun. 13, 2007

(86) PCT No.: PCT/JP2007/061944
§ 371 (c)(1),
(2), (4) Date: Dec. 7, 2009

(87) PCT Pub. No.: WO2007/145262
PCT Pub. Date: Dec. 21, 2007

(65) Prior Publication Data
US 2010/0102607 A1    Apr. 29, 2010

(30) Foreign Application Priority Data
Jun. 13, 2006 (JP) ................ 2006-164074

(51) Int. Cl.
*B60N 2/66* (2006.01)
(52) U.S. Cl. .................................. 297/284.4
(58) Field of Classification Search ............. 297/284.4, 297/452.15
See application file for complete search history.

(56) References Cited

U.S. PATENT DOCUMENTS

| | | | |
|---|---|---|---|
| 4,856,846 A * | 8/1989 | Lohmeyer ............... 297/285 |
| 4,892,356 A * | 1/1990 | Pittman et al. ........... 297/452.15 |
| 4,913,493 A * | 4/1990 | Heidmann ............... 297/285 |
| 5,076,643 A * | 12/1991 | Colasanti et al. ........ 297/284.6 |
| 5,102,196 A * | 4/1992 | Kaneda et al. ........... 297/452.15 |
| 5,518,294 A * | 5/1996 | Ligon et al. ............. 297/284.4 |
| 5,599,069 A * | 2/1997 | Lorbiecki ............... 297/452.15 |
| 5,704,691 A * | 1/1998 | Olson .................... 297/452.55 |
| 6,193,318 B1 * | 2/2001 | Becker et al. ........... 297/452.49 |
| 6,257,665 B1 * | 7/2001 | Nagamitsu et al. ....... 297/285 |
| 6,296,308 B1 | 10/2001 | Cosentino et al. |

FOREIGN PATENT DOCUMENTS

JP    2001-128788 A    5/2001
JP    2006-111066 A    4/2006

* cited by examiner

*Primary Examiner* — Peter R. Brown
(74) *Attorney, Agent, or Firm* — Browdy and Neimark, PLLC

(57) ABSTRACT

A vehicle seat comprises a synthetic resin cushion plate (31) attached to a back frame (3) by way of seat springs (32) so as to be movable forward or backward, a single elastic auxiliary plate (40) attached to the cushion plate (31) so as to be movable forward or backward relative to the cushion plate (31), a specific section of the auxiliary plate (40) formed as a push-out section (70) protruding forward when a distance between an upper edge and a lower edge of the auxiliary plate (40) is shortened by moving the lower edge upward. Elasticity of the auxiliary plate (40) supporting the body of the seated passenger is adjusted by moving the auxiliary plate (40) near the push-out section (70) forward or backward. The push-out section (70) has a corrugated part (71) formed from a sideways projection that projects forward or/and backward as viewed from a side.

7 Claims, 8 Drawing Sheets

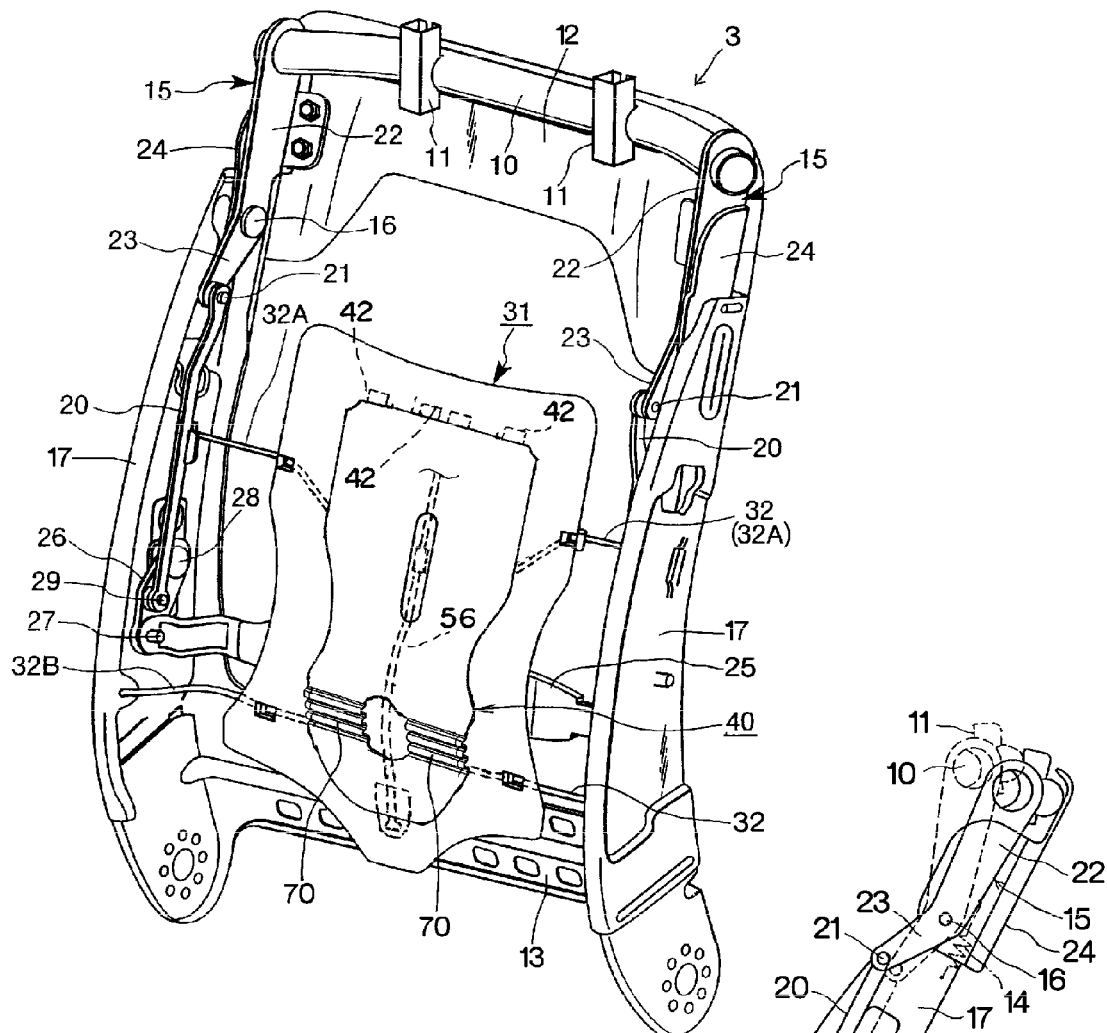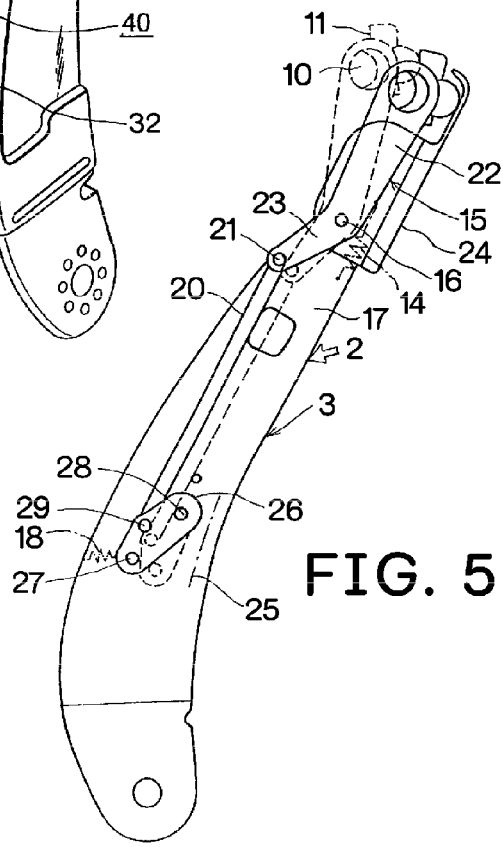

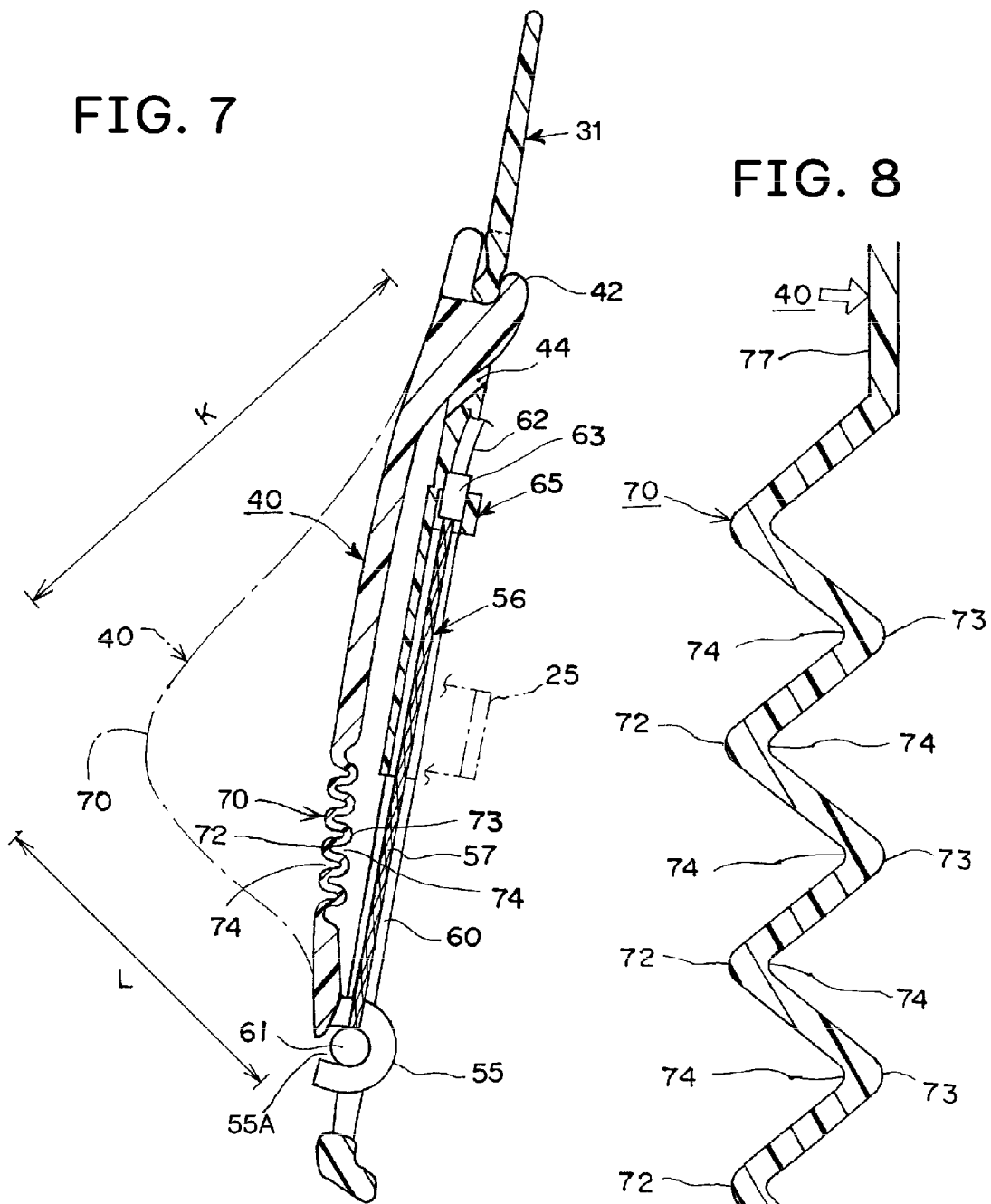

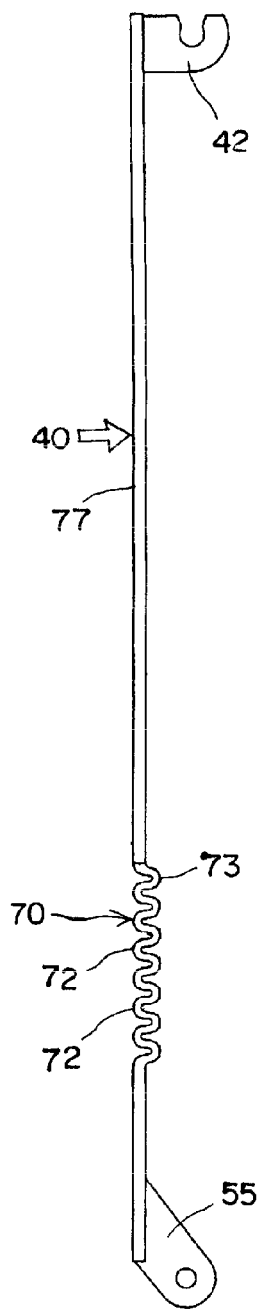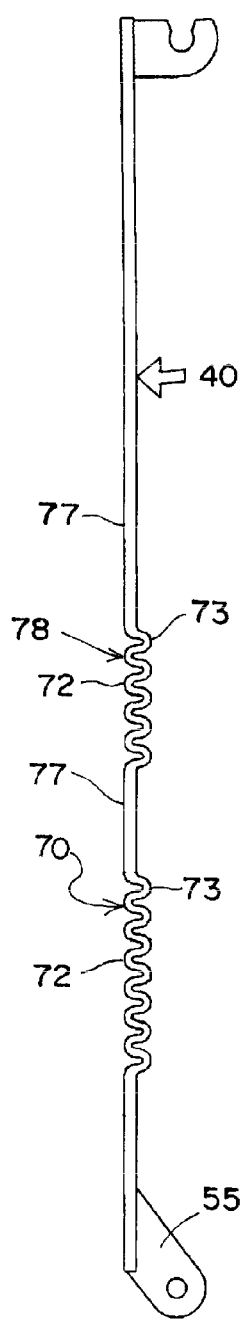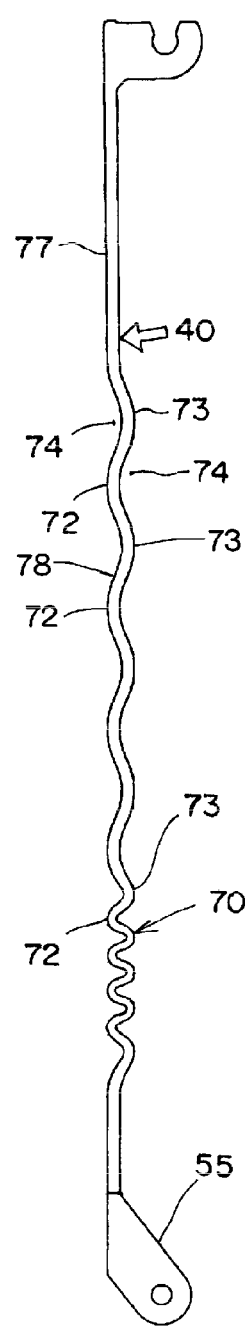

Figure 1:
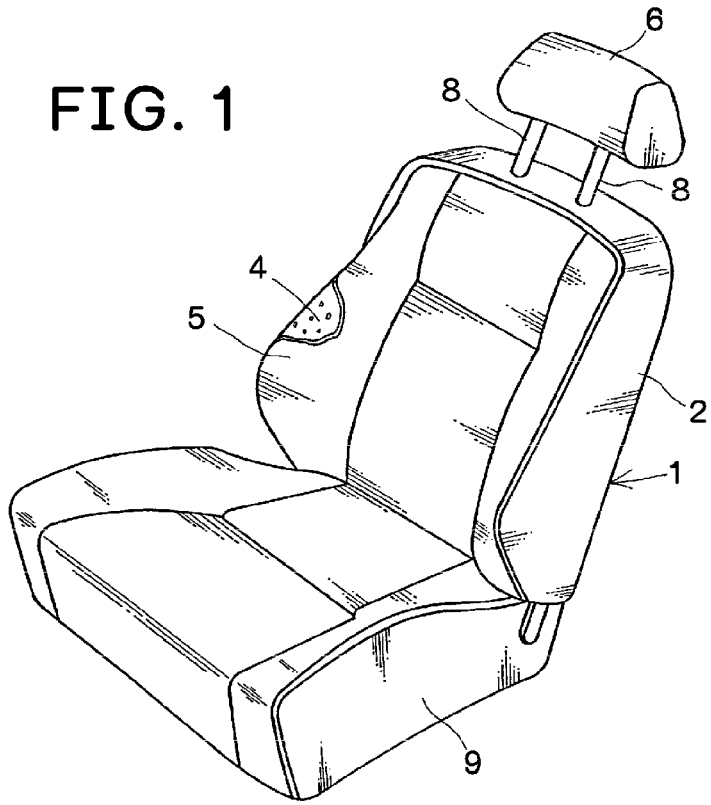
Figure 2:
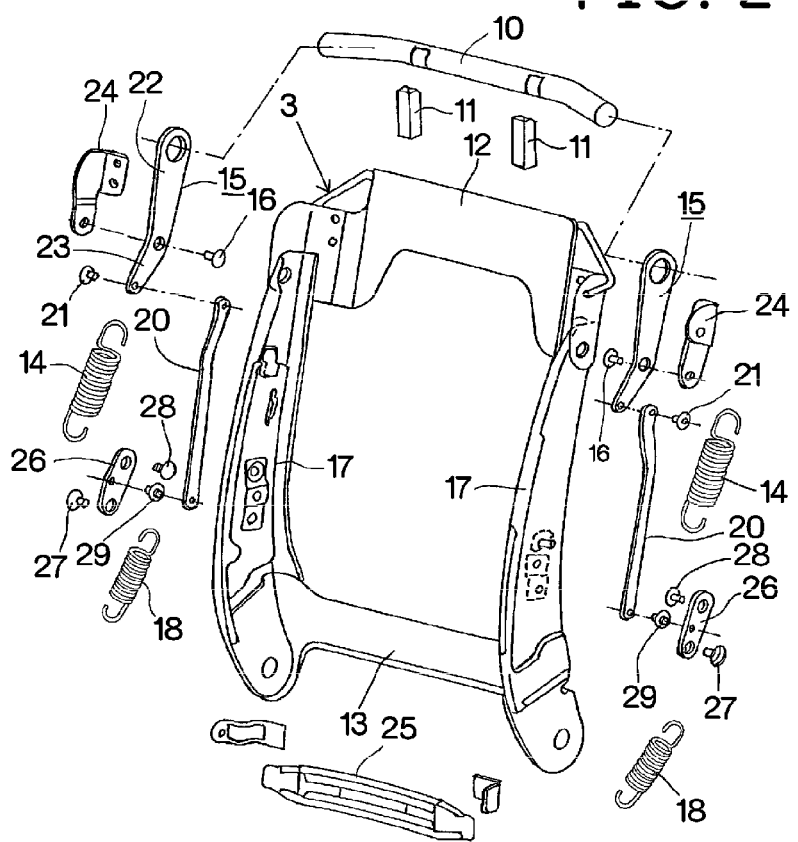
Figure 3:
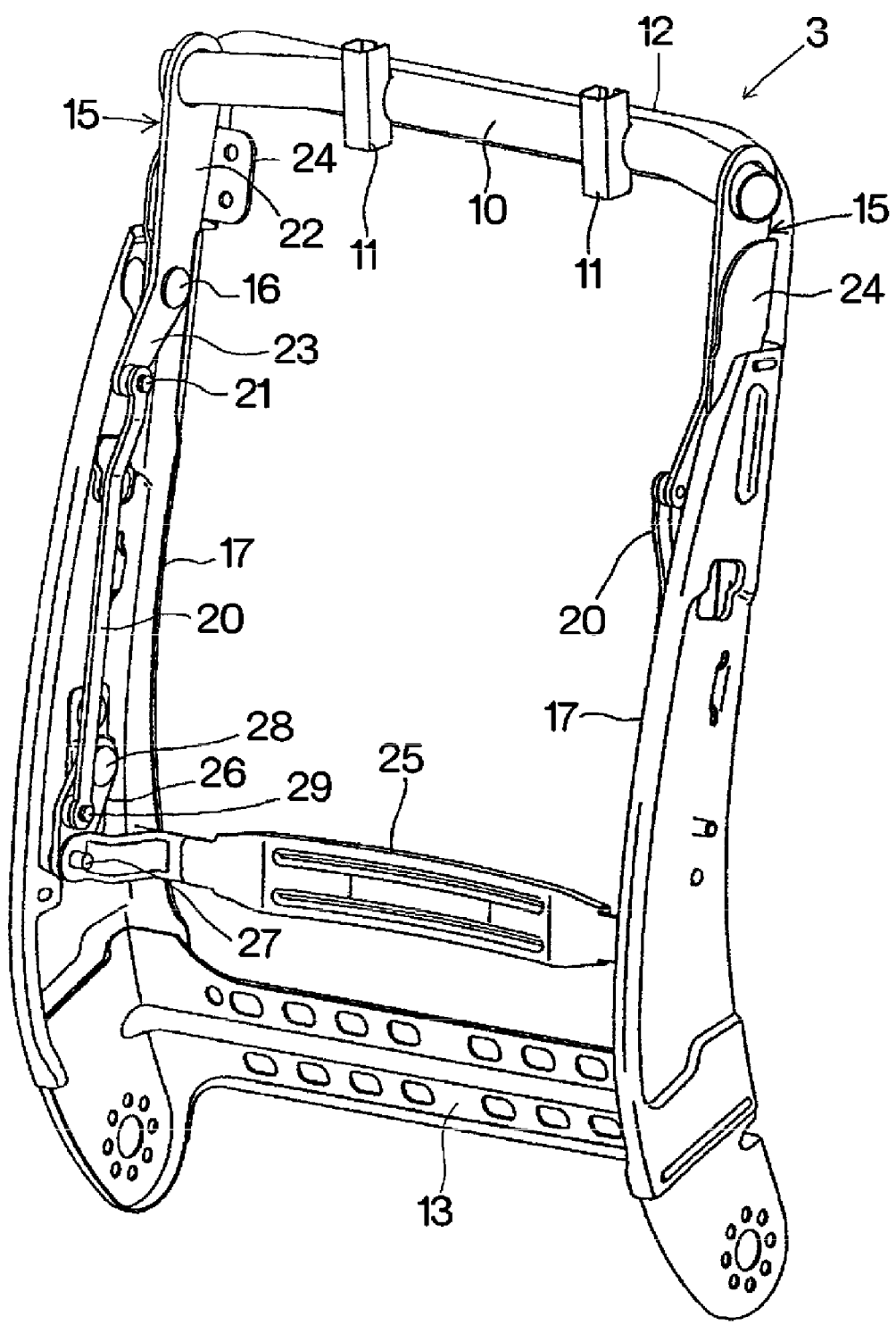

VEHICLE SEAT

TECHNICAL FIELD

The present invention relates to vehicle seats and more particularly relates to vehicle seats that have a mechanism for adjusting the cushion pressure.

BACKGROUND ART

A known conventional configuration (e.g., patent document 1) of a vehicle seat is such that a single synthetic resin plate capable of supporting the back of a seated passenger is attached to a seat back frame for a seat back via wire springs so as to freely move forward or backward relative to the seat back frame.

Another known conventional configuration (e.g., patent document 2) of a vehicle seat is such that an internal structure in the form of a quadrangular frame is fixed to a seat back frame, sideways elastic bending parts are attached to the left and right sides of the internal structure, a spring plate is disposed between the elastic bending parts, and lumbar supports are disposed on the upper and lower sides of the spring plate via a vertical elastic bending part.

Another known conventional configuration (e.g., patent document 3) of a vehicle seat is such that a single synthetic resin plate capable of supporting the back of a seated passenger is fixed to a seat back frame via wire springs so as to freely move forward or backward, an adjusting part movable forward or backward is disposed on part of the plate, thereby adjusting the elastic force for supporting the body of a seated passenger.

Patent document 1: JP 2006-21716 A

Patent document 2: JP 11-206506 A

Patent document 3: JP 2006-111066 A

DISCLOSURE OF THE INVENTION

The configuration described in the JP No. 2006-21716 of the known examples supports a seated passenger satisfactorily but cannot adjust the elastic force according to the body type of a seated passenger. The configuration described in the JP No. 11-206506 of the known examples decreases cushioning by the rigid body that forms all the four sides of the internal structure. Specifically, since the internal structure in the form of the quadrangular frame is disposed in the quadrangular seat back frame, cushioning in areas other than those providing central lumbar support decreases.

The configuration described in JP No. 2006-111066 of the known examples has the adjusting part in an area of the plate. In order to bend this adjusting part, the thickness of a specific portion of the adjusting part is decreased. This narrows the permissible range of plate strength. That is, providing the adjusting part on an area of the plate decreases the rigidity of the plate and hence the load supported by the plate. Decreasing the thickness of a specific portion of the adjusting part also decreases the rigidity of the plate and hence the load supported by the plate.

It is accordingly an object of the present invention to provide a vehicle seat that excels in flexibility according to the body type of a seated passenger.

BRIEF DESCRIPTION OF THE DRAWINGS

FIG. 1 is a perspective view of a vehicle seat.

FIG. 2 is an exploded perspective view of the basic components of the seat back frame and active headrest mechanism of the vehicle seat.

FIG. 3 is a perspective view showing an assembled state from the state shown in FIG. 2.

FIG. 4 is a perspective view showing a cushion plate and an auxiliary plate attached to the cushion plate shown in FIG. 3.

FIG. 5 is a side view of the basic components of a side frame of the seat back frame and those of the active headrest mechanism.

FIG. 6 is a perspective view of the cushion plate, the auxiliary plate, and a wire cable.

FIG. 7 is a side view of the cushion plate and auxiliary plate.

FIG. 8 is a sectional view of a push-out section according to an embodiment.

FIG. 9 is a sectional view of a push-out section according to another embodiment.

FIG. 10 is a sectional view of a push-out section according to another embodiment.

FIG. 11 is a sectional view of an auxiliary plate.

FIG. 12 is a sectional view of an auxiliary plate according to another embodiment.

FIG. 13 is a sectional view of an auxiliary plate according to another embodiment.

FIG. 14 is a perspective view of an auxiliary plate according to another embodiment.

BEST MODE FOR CARRYING OUT THE INVENTION

Embodiments according to the present invention will hereinafter be described with reference to the accompanying drawings. A vehicle seat 1 according to the present invention includes a seat back 2, a seat bottom 9, and a headrest 6 disposed on the top of the seat back 2. A seat back frame 3 for the seat back 2 is quadrangular and has a pair of side frames 17, an upper frame 12, and a lower frame 13. The vehicle seat 1 has a cushion 4 covered with a leather member 5.

Disposed near the upper frame 12 is a headrest support 10 extending sideways and movable relative to the seat back frame 3. Fixed in the support 10 are vertical engaging parts 11, into which the lower parts of the pillars 8 of the headrest 6 are inserted. The pillars 8 are supported so that their heights may be freely adjusted by the vertical engaging parts 11.

A bracket 24 is disposed on the upper part of each of the side frames 17 or at each end of the upper frame 12. An upper link or bell crank 15 is attached to the bracket 24 so as to freely rotate around a shaft 16. This upper link 15 has a long upper arm 22 extending upward and a short lower arm 23 extending forward and downward. The upper link 15 is urged in a clockwise direction by the elasticity of an upper spring 14, as shown in FIG. 5. The spring 14 has first and second ends connected to the upper link 15 and side frame 17 respectively. The left and right sides of the headrest support 10 are connected to the corresponding upper arms 22. Each of the lower arms 23 is pivotally fastened to the upper part of a vertically long connection rod 20.

Normally, each upper link 14 is held in the position indicated by a solid line shown in FIG. 5, for example, by means of the elasticity of the spring 14 and hence the headrest 6 is held in a standard position as well. However, if the upper link 15 rotates counterclockwise toward the position indicated by a dotted line, the headrest support 10 moves forward and consequently the headrest 6 is pushed forward.

Disposed between the side frames 17 is a vehicle rear collision detector 25 extending sideways. If the vehicle seat 1 moves forward relative to a seated passenger in the event of a rear collision, the collision detector 25 is pushed by the seated passenger and moved backward. Each side of the detector 25 is connected to a corresponding lower link 26 by means of a pin 27, and the lower link 26 is pivotally fastened to the corresponding side frame 17 by means of a shaft 28. Connected to each of the lower links 26 by means of a pin 29 is the lower part of one of the corresponding rods 20. As shown in FIG. 5, one and the other end of the lower spring 18 are connected to the lower link 26 and side frame 17 respectively, thereby urging the lower link 26 in a clockwise direction. Thus, the collision detector 25 is held in its normal front position.

In the event that a rear collision should occur, the collision detector 25 is pushed by a seated passenger and moved backward, with the result that the lower link 26 is rotated counterclockwise in FIG. 5 and moves the connection rods 20 downward. At this time, the distance between the pin 29 and shaft 28 is shorter than that between the pin 27 and shaft 28. Therefore, the backward movement of the collision detector 25 is efficiently transmitted to the connection rods 20. The downward movement of each rod 20 efficiently moves the corresponding upper link 15 counterclockwise, thereby moving the headrest support 10 forward. In this case, since the upper arm 22 of each upper link 15 is longer than the lower arm 23 thereof, the downward movement of the corresponding connection rod 20 efficiently moves the headrest support 10 forward. Consequently, the headrest 6 is pushed forward by the forward movement of the support 10 and hence supports the head (or neck) of a seated passenger in the event of a rear collision.

Each of the side frames 17 is formed from a metal plate having a predetermined dimension in the forward or backward direction. A transmission mechanism, which transmits the backward movement of the collision detector 25 to the headrest support 10, is disposed near the side frames 17. Accordingly, the cushion 4 of the seat back 2 does not interfere with the movement of the transmission mechanism. A mechanism extending from the shock detector 25 to the headrest support 10 serves as an active headrest mechanism.

Figure 6:
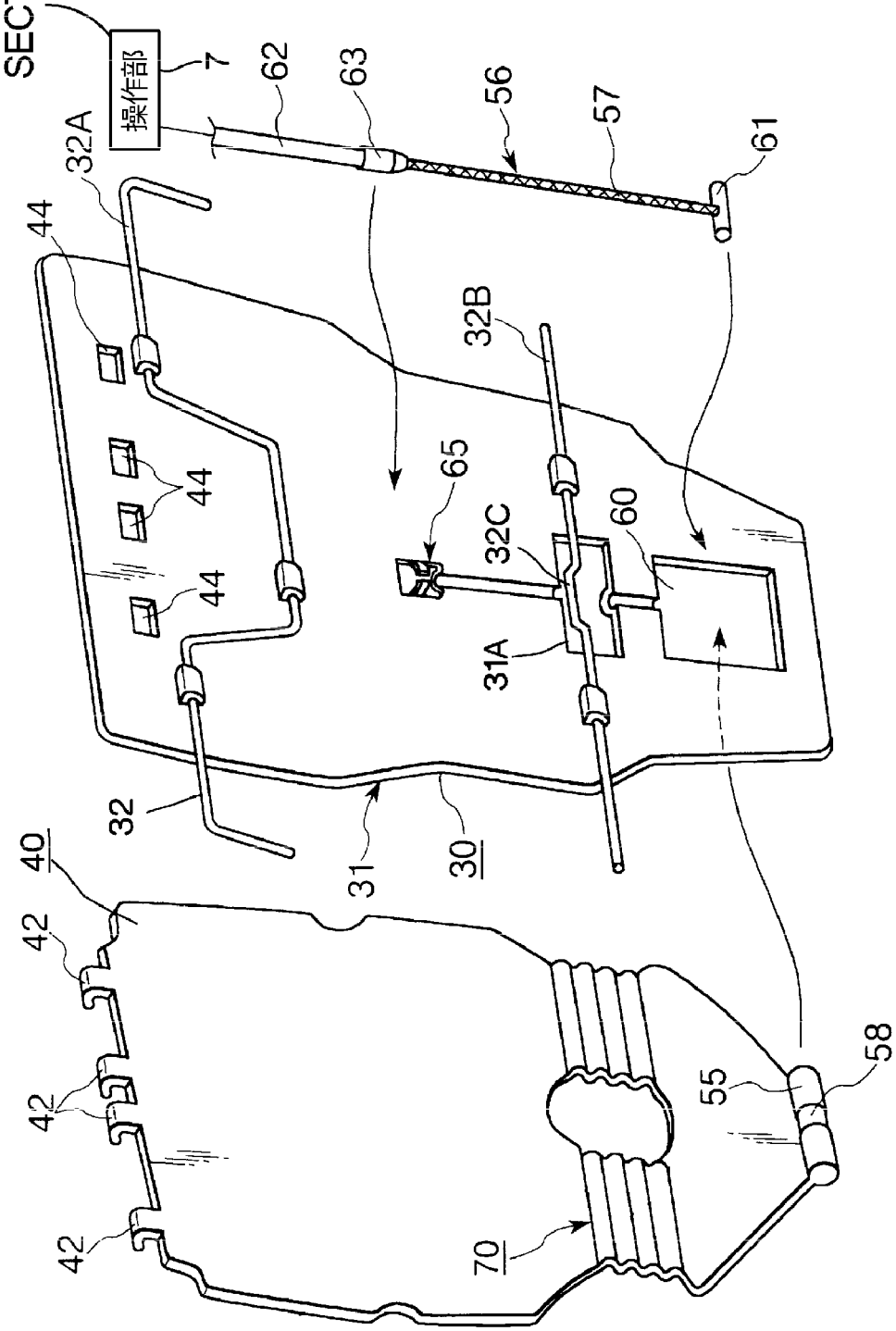

As shown in FIG. 4, disposed inside the back frame 3 is a flexible cushion plate 31. Preferably, the plate 31 is formed from synthetic resin such as polypropylene, and substantially has the form of a single quadrangular plate. The back face of the plate 31 is supported by seat springs 32 such as zigzag springs or formed wire springs. The seat springs 32 are at least an upper seat spring 32A and a lower seat spring 32B. As is apparent from FIG. 6, the bent portion 32C formed in the middle of the lower seat spring 32B is positioned so as to engage with an opening 31A defined in the cushion plate 31. Each of the springs 32 extends substantially sideways, and both ends of each are connected to the corresponding side frames 17 of the seat back frame 3. The upper spring 32A supports an area near the upper edge of the cushion plate 31, and the lower spring 32B supports the middle of cushion plate 31. The cushion plate 31 is disposed further backward than the seat back cushion 4. Engaging the bent portion 32C with the opening 31A enables the cushion plate 31 to be held in the appropriate position by means of the seat spring 32B.

The cushion plate 31 bends upon receiving load from a seated passenger and moves backward against the elasticity of the springs 32, thereby flexibly supporting the seated passenger. The plate 31 supports the cushion 4 with the "plane," thus ensuring greater safety and comfort for a seated passenger than a conventional configuration in which a cushion 4 is supported only by seat springs 32.

The cushion detector 25 is disposed behind the cushion plate 31 with a predetermined space between them. The cushion plate 31 has a plate form so as to broadly cover the back of a seated passenger. In the event of a rear collision, the cushion plate 31 moves backward while receiving the load of the seated passenger over a wide area. In this case, the degree of backward movement of the cushion plate 31 is greatest between the vertical center of the plate and an area just below that. For this reason, the cushion detector 25 is preferably disposed in a place corresponding to the vertical center of the cushion plate 31 or in a place corresponding to the area just below that, so as to securely cushion backward movement of the cushion plate 31.

Such a combination of the cushion plate 31 and collision detector 25 yields the desired comfort and a secure hold for a seated passenger, and reliable detection of a rear collision.

Disposed between the seat cushion 4 and the cushion plate 31 is a flexible auxiliary plate 40. Preferably, the auxiliary plate 40 is formed from a synthetic resin, such as polypropylene, and has the form of a single quadrangular plate smaller than the cushion plate 31. The auxiliary plate 40 is attached to the cushion plate 31 and bends forward, as shown in FIG. 7, as operated by a seated passenger. The cushion 4 is pushed forward by the bending of the auxiliary plate 40, thus adjusting the cushion pressure on a seated passenger.

A number of engaging hooks 42 are formed integrally with the upper part of the auxiliary plate 40. The engaging hooks 42 engage with engagement holes 44 formed in the cushion plate 31. The lower part of the auxiliary plate 40 has a lower engaging part 55 jutting out backward. Locked in the lower engaging part 55 is a cable head 61 provided for the inner cable 57 of the wire cable 56. The wire cable 56 is connected to an operating section 7 provided for the vehicle seat 1. The lower engaging part 55 has an accommodating recess 55A in which the cable head 61 can be accommodated, and a slit 58 through which the inner cable 57 can pass.

Formed in the lower part of the cushion plate 31 is a lower guide slot 60, with which the lower engaging part 55 engages so as to slide freely. When the cable head 61 moves upward or downward according to the operation performed by a seated passenger, the lower engaging part 55 is guided by the slot 60 and smoothly moves vertically without backlash. The appropriate widths of the lower engaging part 55 and slot 60 are set so as to prevent backlash. The cushion plate 31 is provided with a tube holding part 65 for holding the leading end 63 of an outer tube 62 provided for the wire cable 56.

When the cable head 61 is moved upward by a seated passenger operating the operating section 7, the lower engaging part 55 smoothly moves upward without backlash while guided by the slot 60. Consequently, the auxiliary plate 40 bends forward (i.e., bulges out), as shown in FIG. 7, so as to push the cushion 4 forward and outward, thus adjusting the cushion pressure on the seated passenger.

By pulling the wire cable 56, the auxiliary plate 40 protrudes forward and pushes the cushion 4 forward, thereby adjusting the cushion pressure on a seated passenger. However, it is not desirable that the maximum forward projection of the auxiliary plate 40 is vertically affected by pressure, etc., from a seated passenger. For example, while the upper part of the auxiliary plate 40 may project forward upon the operation of the auxiliary plate 40 by a female of relatively lightweight, the lower part thereof may project forward upon the operation of the auxiliary plate 40 by a male of heavy weight. Such an auxiliary plate will not ensure the comfort desired by a seated passenger. In order to overcome such a drawback, the auxiliary plate 40 is provided with a push-out section 70 that facilitates forward protrusion of the auxiliary plate 40, thus stabilizing the maximum projecting position of the auxiliary plate 40.

The push-out section 70 according to the present invention has the form of a corrugated or bellows-like plate. Preferably, the push-out section 70 has a number of forward projections 72 and a number of backward projections 73. The push-out section 70 in the form of the corrugated plate is notably bendable, compared to the other part of the auxiliary plate 40. Thus, the push-out section 70 is defined as the maximum forward projections of the auxiliary plate 40. Accordingly, the maximum forward projecting position of the plate 40 stabilizes.

Figure 9:
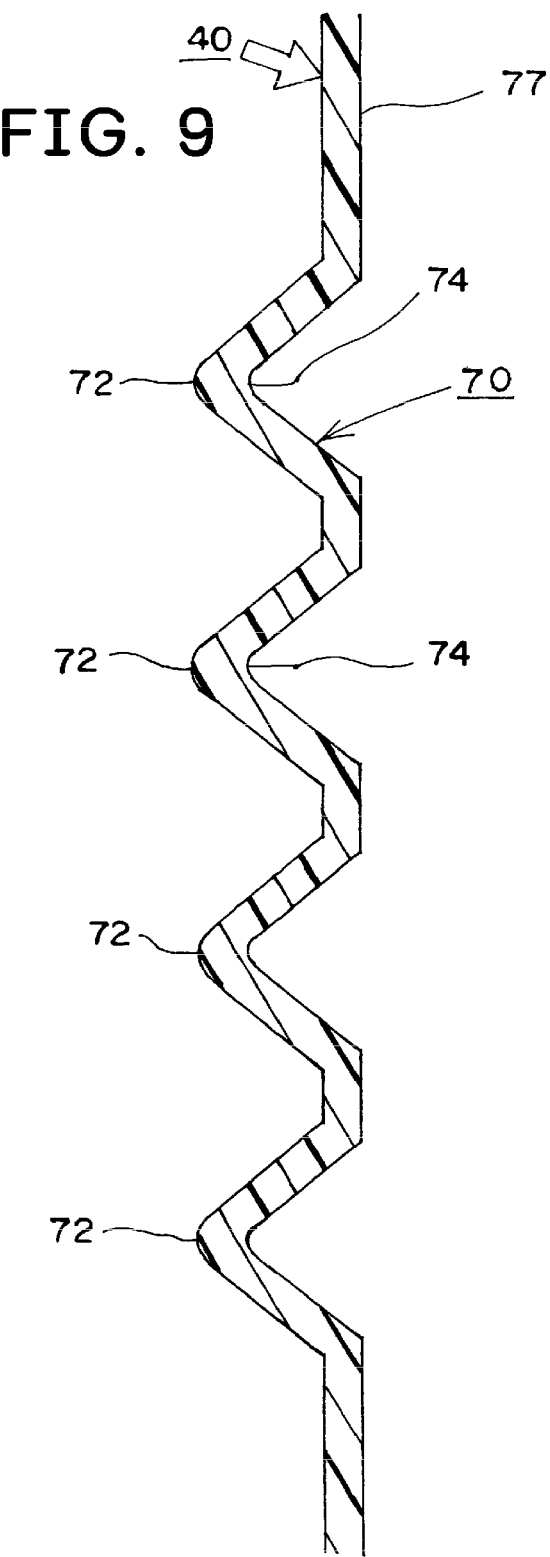
Figure 10:
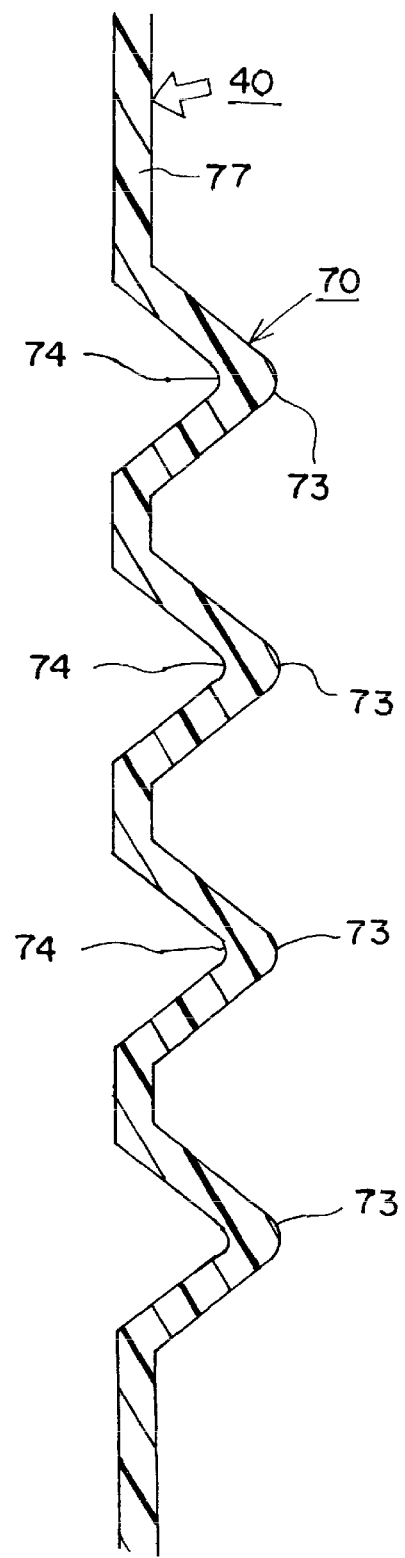
Figure 14:
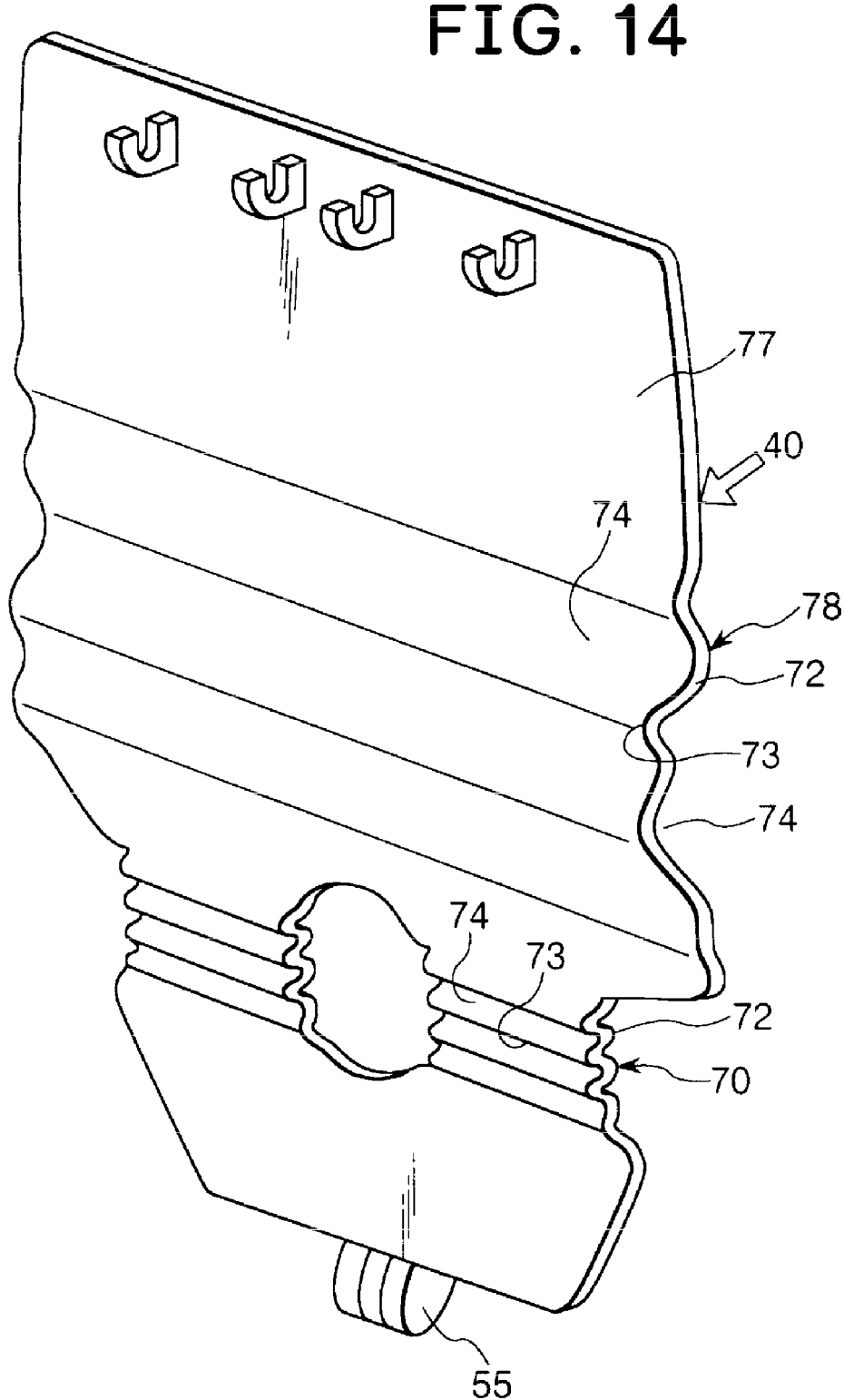

FIG. 9 shows an example where the auxiliary plate 40 has no backward projections 73 whereas FIG. 10 shows an example where the auxiliary plate 40 has no forward projections 72.

Shortening the vertical intervals of the forward projections 72 (or the backward projections 73) of the auxiliary plate 40 further increase the flexibility of the push-out section 70 to bend. In addition, increasing the number of forward projections 72 (or the backward projections 73) of the auxiliary plate 40 further increases the flexibility of the push-out section 70 to bend. Accordingly, the shape of the push-out section 70 is determined taking into account the required flexibility. The push-out section 70 is disposed in the appropriate part of the auxiliary plate 40 so as to support from the back a part near the lumbar vertebrae of a passenger seated in the vehicle seat 1.

In a representative example of the auxiliary plate 40 shown in FIGS. 8 and 11, each of the forward projections 72 and each of the backward projections 73 have the shape of an arc of radius of about 1.4 to 6.0 millimeters. The back face 74 of each of the forward and backward projections 72 and 73 respectively has the shape of an arc of radius of about 0.4 to 3.0 millimeters. The thickness of the auxiliary plate 40 is about 2.0 to 5.0 millimeters, and the thickness of the push-out section 70 is about 1.0 to 3.0 millimeters. The distance between the forward and backward projections 72 and 73 is approximately 3.0 to 15 millimeters.

In the auxiliary plate 40 shown in FIG. 11, the upper part of the push-out section 70 is a flat area 77. However, as shown in FIG. 12, the auxiliary plate 40 may have above the push-out section 70 a second bending section 78 of greater flexibility. The second bending section 78 smoothly bends the auxiliary plate 40 above the push-out section 70 such that the entire bending profile of the auxiliary plate 40 more nearly approaches to a desired shape. Accordingly, the auxiliary plate 40 ensures outstanding comfort for a seated passenger.

Like the auxiliary plate 40 shown in FIG. 12, an auxiliary plate 40 shown in FIG. 13 has a push-out section 70 located in a low position and, a second bending section 78, in a high position. However, the push-out section 70 and second bending section 78 in FIG. 13 differ in the intervals between creases such that the crease intervals of the push-out section 70 are short and those of the second bending section 78 are long. The applied example shown in FIG. 13 can also make the entire bending profile of the auxiliary plate 40 more nearly approach to a desired shape. Accordingly, the auxiliary plate 40 ensures outstanding comfort for a seated passenger. Each of the forward and backward projections 72 and 73, respectively, of the second bending section 78 shown in FIG. 13 has the shape of an arc of radius of about 5.0 to 20 millimeters.

Strictly speaking, the more appropriate position for the push-out section 70 is one that changes vertically according to the body type of a seated passenger. Generally, a big seated passenger prefers the push-out section 70 to be set in a higher position whereas a small seated passenger prefers the push-out section 70 to be set in a lower position. It is difficult to satisfy both these demands by means of a low cost mechanism. However, even a low-cost mechanism can make the position of the push-out section 70 more stable. For instance, if the push-out section 70 is pushed forward by the operation of the operating section 7, the push-out section 70 may gradually shift upward or downward. Such instability is decreased by making the distance K between the upper end of the auxiliary plate 40 and the push-out section 70 longer and the distance L between the lower end of the auxiliary plate 40 and the push-out section 70 shorter, as shown in FIG. 7.

The invention claimed is:

1. A vehicle seat comprising:
 a back frame (3) for a seat back (2);
 a single synthetic resin cushion plate (31) being capable of supporting the back of a seated passenger and attached to the back frame (3) by way of seat springs (32) so as to be movable forward or backward relative to the back frame (3);
 a single elastic auxiliary plate (40) attached to the cushion plate (31) so as to be movable forward or backward relative to the cushion plate (31);
 a specific section of the auxiliary plate (40) formed as a push-out section (70) protruding forward when a distance between an upper edge and a lower edge of the auxiliary plate (40) is shortened by moving the lower edge upward, the push-out section (70) being positioned only below a center line of the auxiliary plate (40) so as to support lumbar vertebrae of a person seated in the vehicle seat;
 wherein elasticity of the auxiliary plate (40) supporting the body of the seated passenger is adjusted by moving the auxiliary plate (40) near the push-out section (70) forward or backward; and
 wherein the push-out section (70) has a corrugated part formed from a sideways projection that projects forward or/and backward as viewed from a side, said corrugated part being in a maximum forward projection position.

2. The vehicle seat according to claim 1, wherein the corrugated part has in a vertical direction more than one projection of predetermined vertical dimension.

3. The vehicle seat according to claim 2, wherein the auxiliary plate (40) has a second bending section (78) above the corrugated part, the second bending section (78) being formed from a sideways projection that projects forward or/and backward.

4. The vehicle seat according to claim 1, wherein the auxiliary plate (40) has a second bending section (78) above the corrugated part, the second bending section (78) being formed from a sideways projection that projects forward or/and backward.

5. The vehicle seat according to claim 1, wherein the push-out section (70) has forward projections (72) and backward projections (73).

6. The vehicle seat according to claim 1, wherein the specific section formed as the push-out section (70) forms only a portion of the auxiliary plate (40).

7. A vehicle seat comprising:
 a back frame (3) for a seat back (2);
 a single synthetic resin cushion plate (31) being capable of supporting the back of a seated passenger and attached to the back frame (3) by way of seat springs (32) so as to be movable forward or backward relative to the back frame (3);

a single elastic auxiliary plate (40) attached to the cushion plate (31) so as to be movable forward or backward relative to the cushion plate (31);

a specific section of the auxiliary plate (40) formed as a push-out section (70) protruding forward when a distance between an upper edge and a lower edge of the auxiliary plate (40) is shortened by moving the lower edge upward;

wherein elasticity of the auxiliary plate (40) supporting the body of the seated passenger is adjusted by moving the auxiliary plate (40) near the push-out section (70) forward or backward;

wherein the push-out section (70) has a corrugated part formed from a sideways projection that projects forward or/and backward as viewed from a side; and wherein the auxiliary plate (40) has the second bending section (78) above the corrugated part, the corrugated part having curves each of which is small in vertical dimension and the second bending section (78) having curves each of which is large in vertical dimension.

* * * * *